(No Model.) 4 Sheets—Sheet 1.
C. F. GOLLER.
CASH DRAWER AND RECORD SHEET HOLDER.

No. 495,671. Patented Apr. 18, 1893.

Witnesses:
Frank H. Thatcher
Chas. T. Moore

Inventor:
Charles F. Goller
By Patrick O'Farrell
Attorney.

(No Model.)  4 Sheets—Sheet 2.

C. F. GOLLER.
CASH DRAWER AND RECORD SHEET HOLDER.

No. 495,671. Patented Apr. 18, 1893.

Witnesses:
Frank H. Thatcher
Chas. T. Moore

Inventor:
By, Charles F. Goller
Patrick O'Farrell
Attorney.

THE NORRIS PETERS CO., PHOTO-LITHO., WASHINGTON, D. C.

(No Model.) 4 Sheets—Sheet 3.
C. F. GOLLER.
CASH DRAWER AND RECORD SHEET HOLDER.
No. 495,671. Patented Apr. 18, 1893.

Witnesses:
Frank H. Thatcher
Chas. T. Moore

Inventor
Charles F. Goller
By Patrick O'Farrell
Attorney.

(No Model.) 4 Sheets—Sheet 4.
C. F. GOLLER.
CASH DRAWER AND RECORD SHEET HOLDER.
No. 495,671. Patented Apr. 18, 1893.
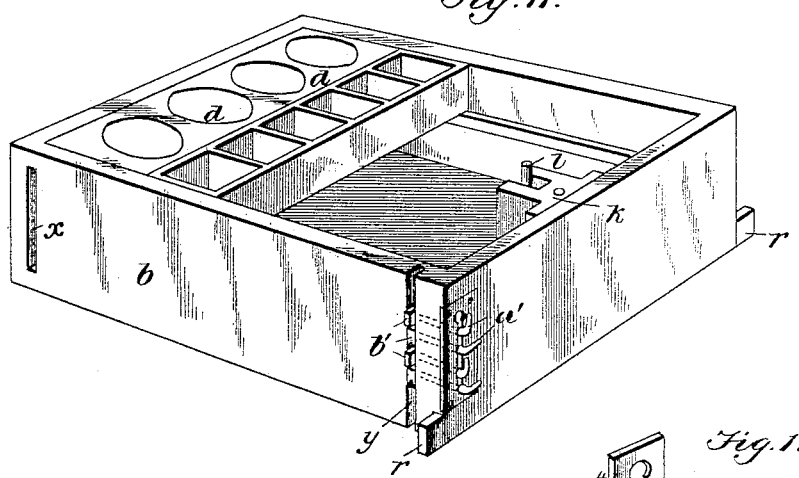
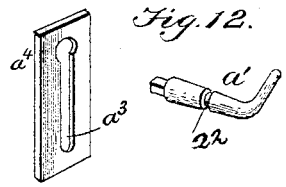
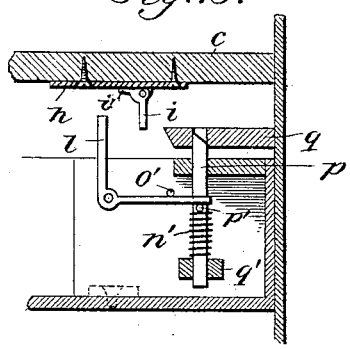
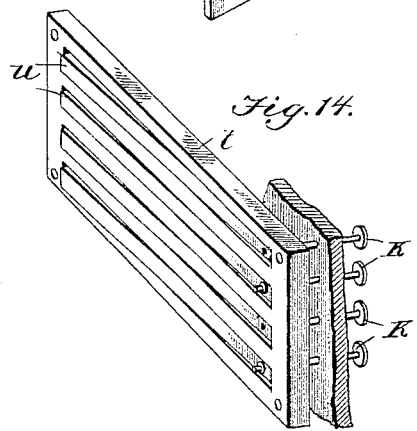
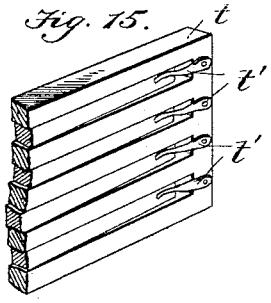
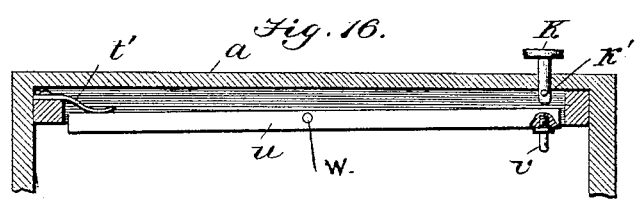

UNITED STATES PATENT OFFICE.

CHARLES F. GOLLER, OF MAQUOKETA, IOWA.

CASH-DRAWER AND RECORD-SHEET HOLDER.

SPECIFICATION forming part of Letters Patent No. 495,671, dated April 18, 1893.

Application filed September 30, 1891. Serial No. 407,362. (No model.)

*To all whom it may concern:*

Be it known that I, CHARLES F. GOLLER, a citizen of the United States of America, residing at Maquoketa, in the county of Jackson and State of Iowa, have invented certain new and useful Improvements in a Combined Cash-Drawer and Register Holder, of which the following is a specification, reference being had therein to the accompanying drawings.

My invention relates to cash-drawers and record-holders; and it belongs to that class wherein the indicating, and automatic recording mechanisms are omitted, and it consists in providing the cash-drawer with certain novel locking mechanisms which keep the drawer normally locked, and further in providing a cash-sheet-slide or holder, which must first be drawn from its normal position and then returned thereto in order to free the cash-drawer. The object of my invention being to insure the recording of all transactions requiring access to the cash-drawer, by so arranging the record-holder that it must be withdrawn and returned before the cash-drawer can be opened.

Figure 1:
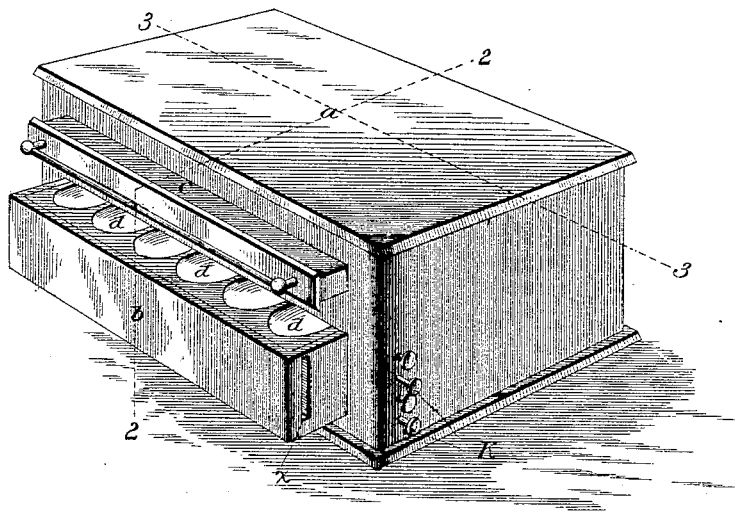
Figure 2:
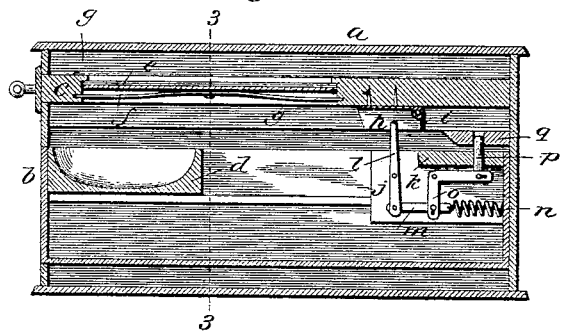
Figure 3:
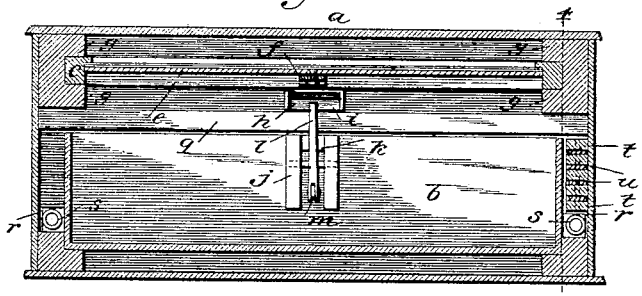
Figure 4:
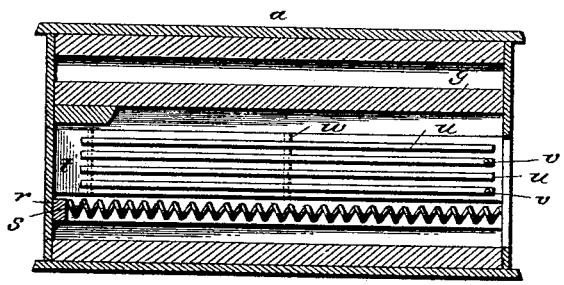
Figure 5:
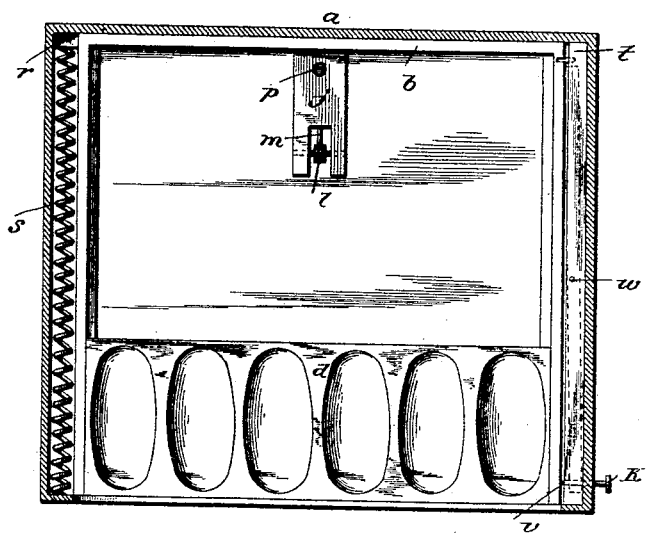
Figure 6:
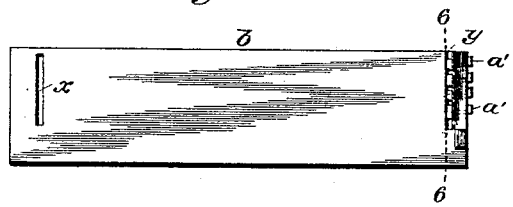
Figure 7:
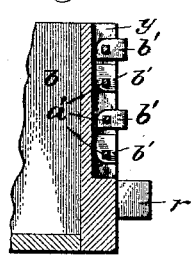
Figure 8:
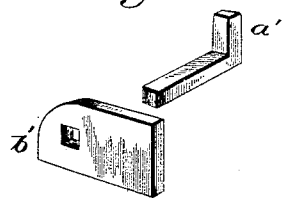
Figure 9:
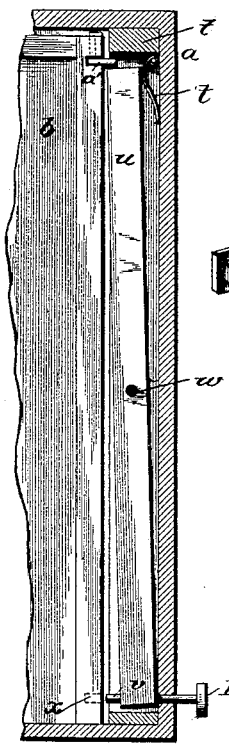
Figure 10:
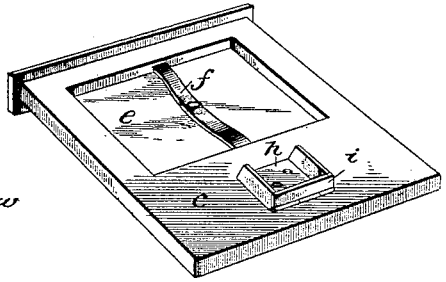

In the accompanying drawings: Figure 1 is a perspective view showing the general appearance of my improved drawer and record-holder, in which the drawer and recorder carrier are shown as partly opened, the finger keys for unlocking the drawer being shown at the side of the case, and the slot for giving effect to dummy keys being shown at the side of the drawer. Fig. 2 is a vertical section taken on the line 2—2 of Fig. 1, looking from the side. Fig. 3 is a vertical section taken on the line 3—3, Figs. 1 and 2, looking from the front. Fig. 4 is a vertical section taken on the line 4—4 of Fig. 3. Fig. 5 is a plan of the money drawer showing housing in section, and exposing one of the springs for automatically forcing out the money drawer when it has been unlocked, a similar spring on the opposite side being indicated by dotted lines. Fig. 6 is an end elevation of cash-drawer, showing parts of the combination lock attached. Fig. 7 is a detail section taken on the line 6—6 of Fig. 6. Fig. 8 shows details in perspective of a bolt and key of combination lock. Fig. 9 is an enlarged view taken on a line flush with the top of money drawer. Fig. 10 is a perspective of the record holder, being inverted to show the device for actuating the automatic lock. Fig. 11 is a perspective view of the money drawer as it appears when withdrawn from the casing or housing. Fig. 12 is a perspective view showing a different form of the turn-keys for setting or altering the combinations of the side lock, from that shown in Fig. 8, it also shows an attaching plate for securing said keys to the drawer. Fig. 13 is a vertical sectional view showing an improved form of the automatic lock. Fig. 14 is a perspective view partly in section, showing the frame and key-levers of the combination or side lock with a part of the casing and key-buttons. Fig. 15 is a perspective showing the manner of securing the springs for holding the key-levers in operative position. Fig. 16 is a sectional view showing a finger-key and lever in operative position.

Like letters of reference indicate corresponding parts through the several views.

Referring to the drawings by letter, $a$ is the case or housing in which the cash-drawer $b$ and the record holder $c$ are placed, the latter being provided with a rectangular opening into which is fitted a board $e$ provided with a spring $f$, the upper part of the walls of the opening forming a projecting flange, and the front and rear walls of the opening being provided with grooves to accommodate the free ends of the spring $f$, the spring $f$ is pivoted loosely to the center of the board $e$, and by turning it diagonally across the board, the ends will become disengaged from the grooves in the walls of the opening of the record-holder, and permit the withdrawal of the board $e$, if then a series of loose sheets or a paper pad be inserted in the opening and the board $e$ be replaced and the ends of the spring $f$ be returned to the grooves, the paper will be forced up against the flange formed by the projecting walls of the upper part of said opening in the record holder, and thus present an even surface upon which may be recorded the various transactions requiring access to the money drawer, and as the record is completed on each separate sheet it may be withdrawn and the spring will force the board upward carrying the pad with it, thus providing fresh sheets until the supply has been exhausted, when the board $e$ may be withdrawn and a new pad inserted as before described.

On the under side of the holder $c$ is attached a plate $h$, the sides of which are bent downward at right angles to the main body, to the front of this plate is hinged a flap $i$, the normal position of which is shown in Fig. 10, except that the figure is inverted in order to better expose the device, the function of which is to free the cash-drawer upon the return of the record holder, if the right combination of finger-keys has been previously depressed, and so held while the record holder is being returned.

In the rear portion of the cash-drawer I provide a lock $j$, an improved form of which is shown in Fig. 13, the two plates of this lock are connected by a cross-head $k$, between these plates is pivoted a lever $l$, one end of which is free, the other being connected with the link $m$ as shown in Fig. 2, the link being connected with the back of the drawer, or by suitable connection to the lock plates by means of a spring $n$, the link $m$ is provided with a pin that connects it with the bifurcated end of a bell crank lever $o$, the other end of said lever connecting with the bolt $p$ which registers with, and enters a recess in the cross-bar $q$, which is rigidly connected with the frame or housing.

The front of the cash-drawer is provided with suitable compartments for coin, bills, checks, &c.

The operation of my improved device is as follows: The person seeking access to the money drawer, first, withdraws the record holder $c$, in doing this he is reminded to make a record of the transaction which has made it necessary to have access to the money drawer, upon the withdrawal of the record holder the flap $i$ will ride over the end of the lever $l$ as on the outward movement of the record holder the flap is free to turn and the end of the lever $l$ is rigid. The record holder must now be returned before the money drawer will open, the operator therefore presses certain keys K K at the side of the case (see Figs. 1, 9, 14 and 16,) and at the same time returns the record holder, upon the return of the holder the flap $i$ engages the end of the lever $l$ of the automatic lock, and as the flap is prevented by reason of its contact with the angle plates formed by the sides of the plate $h$, from yielding when the holder is given the return movement, the lever $l$ will be forced back until the flap $i$ in its vertical position can pass it, this movement of the lever $l$ causes it to draw the link $m$ against the action of the retaining spring $n$, and through the pivotal connection between said link and the bell-crank lever $o$ the bolt $p$ is withdrawn from the opening in cross-bar $q$ of the frame, this action frees the drawer and it is automatically forced out by the spiral springs $s$ $s$, (see Figs. 3 and 5.) It will be observed, however, that it has been necessary to press the keys K K on returning the record holder in order to free the drawer, and yet no connection has been established between said keys and the drawer. I will now describe this part of the mechanism by referring to Figs. 6, 9, and 11 inclusive. In Fig. 6 a side view of the cash-drawer is shown just as it would appear if withdrawn from its housing, and Fig. 11 shows a perspective of the entire drawer. Near the front of the drawer there is a groove $x$ the use of which will presently be described, and near the other end there is a groove $y$ into which are arranged a series of bolts $b'$, (see Fig. 11,) four being shown for the purpose of illustration, though any desirable number may be used that is found convenient. These bolts are placed in the groove $y$ and two of them are turned in against the side of the drawer so as to be entirely within the groove, and two are turned so that they will project out of said groove as shown in Figs. 7 and 11. From the back of the drawer a series of rods $a'$ bent as shown in Figs. 8 and 12, are inserted so that their inner ends will register with, and enter the openings in said bolts. These rods may be either square or round. I prefer the round form shown in Fig. 12. When the cash drawer is unhoused the bolts may be arranged to protrude, or be closed into the groove $y$ at the pleasure of the proprietor by using the turn keys $a'$. We will now suppose that the drawer has been housed with two of the bolts $b'$ protruding and two closed into the groove $y$. Opposite each of the four bolts and in the side of the casing is pivoted at $w$ a series of key-levers $u$, corresponding in number and position to said bolts, one end of said levers being held to obstruct the path the protruding bolts must traverse when the drawer is withdrawn, or forced out, or attached to the stems of the key-buttons which are on the outside of the casing. It will now be seen why it was necessary to press the keys when the record holder was returned in order to free the drawer, for previous to the depression of the keys two of the bolts $b'$ rested against the ends of the corresponding levers $u$, and although the record holder would have freed the drawer from the automatic lock located inside the drawer, it would have had no effect on this side lock which would still have held the drawer closed, if the keys corresponding to said levers had not been simultaneously depressed and so held until the return of the record holder. It is now in order to show the use of the bolts $b'$ which are closed into the groove $y$ and the levers corresponding thereto. These bolts it will be observed have no action in retaining the drawer as they can pass freely by the ends of the corresponding key levers $u$ when the drawer is to be opened. But, it will also be observed that the keys corresponding to these closed bolts are provided at their opposite ends with pins $v$ that register with, and may enter a groove $x$ in the side of the drawer, when any of the keys provided with pins $v$ are depressed the pin will enter the groove $x$ and prevent the drawer from being forced out notwithstanding it has been freed from the operation of the other locks, the object of this is to form a combination lock and prevent the drawer from being opened by any person not acquainted with the combination, these combinations may be changed by removing the pins $v$ and placing them on other keys, turning the corresponding bolts $b'$ out opposite the ends of the key-levers from which the pins have been removed, and opposite the keys upon which the pins have been placed. When it is desired to open the cash-drawer a person understanding the combination can do so by first withdrawing the record holder then pressing the keys corresponding to the combination and simultaneously returning the record holder, the return of the record holder will unlock the automatic lock within the drawer and the keys will operate to release the drawer from the combination lock when the drawer will be forced out by the spiral spring $s\ s$ as already described. The manner of attaching the pins $v$ to the key-levers $u$ is shown in Fig. 16 at $k'$. It will thus be observed that should a person understanding the method of opening the drawer, but being ignorant of the proper combination undertake to open it he would be most likely to fail in his attempt, as he would either press some of the keys having the pins $v$ attached, or he would fail to press all upon which the protruding bolts $b'$ operated, and in either event the drawer would not be unlocked.

In Fig. 12 I show the turn keys of the side or combination lock as being round instead of square as shown in Fig. 8 except at the end where they are left square to fit the bolts $b'$, I further show the shank of these keys as being provided with a groove $a^2$ which fits into a slot $a^3$ of an attaching plate $a^4$, the keys being passed through the enlargement of the slot at one end and pressed down until the grooves in the key shanks are brought between the narrowed sides of the slot $a^3$ the plate is then attached to the end of the drawer as shown in Fig. 11.

In Fig. 13 I show an improved form of my automatic lock. In this view the flap $i$ of the plate $h$ is provided with a short arm $i'$ which takes the place of the downwardly projecting sides of the plate $h$ as seen in Figs. 2 and 10, and the lever $l$ of the automatic lock has its lower half bent at right angles so as to form an arm or bell-crank to operate the bolt $p$, thereby omitting the link $m$ and bell-crank $o$, shown in Fig. 2.

In Fig. 16 the key K is shown as passing through the casing and secured by a pin K', in this view the key-buttons and shanks are shown as being separated from the levers $u$. The pins $v$ are shown screwed to the levers $u$ in order that they may be readily transferred to other levers when it is desirable to alter the combination in the manner already described.

The keys may be lettered, numbered, or have arbitrary signs or characters upon them to enable those knowing the combination to readily select the right keys.

Having thus described my invention, what I claim as new, and desire to secure by Letters Patent, is—

1. In a cash repository the combination of a drawer normally under lock, a freely moving record holder, and means for freeing the drawer by the act of housing the holder substantially as described and for the purpose specified.

2. In a cash repository, the combination of a drawer normally locked, a record-holder free to move, two locking mechanisms normally engaging the drawer; one disengaged by the record-holder, and the other by an independent means, substantially as described.

3. In a cash repository the combination of a drawer normally locked, a record-holder free to move, and two locking mechanisms normally engaging the drawer, one operated by the record-holder, and the other by independent means, and consisting of locking devices, some of which are normally in, and others normally out of engagement with the drawer, substantially as described.

4. In a cash repository the combination of a drawer normally locked, a record-holder free to move, two locking mechanisms, one actuated to free the drawer by the action of the record-holder, and the other actuated by a series of finger keys, substantially as described.

5. In a cash repository the combination of a drawer normally locked by two mechanisms, a record-holder free to move, for freeing the drawer from one mechanism, and a series of keys to free the drawer from the other mechanism, and a series of keys to prevent the drawer from opening when free from the normal locks, substantially as described.

6. In a cash repository, the combination of a series of finger key-levers pivotally arranged in connection with the drawer, and normally locking the same, and a series of finger key-levers similarly arranged, and normally inoperative; a second lock normally engaging said drawer and a record-holder for operating said lock, and means for freeing the drawer from the action of the normal locks, and means for locking the drawer by actuating the keys normally inoperative, substantially as described.

7. In a cash repository, a housing, a drawer, a movable record-holder, and two locking mechanisms acting automatically to lock the drawer on housing it, one mechanism being operated to free the drawer by devices moved by the record-holder, and the other so operated by the finger-keys, substantially as described.

8. In a cash repository the combination of a drawer normally locked, a record-holder free to move, two locking mechanisms normally engaging the drawer, and means for disengaging the drawer from the action of both locks, and means for automatically opening the drawer when disengaged, substantially as described.

In testimony whereof I affix my signature in presence of two witnesses.

CHARLES F. GOLLER.

Witnesses:
R. G. GRANT,
H. B. HUBBELL.